US009712747B2

(12) United States Patent
Ardö

(10) Patent No.: US 9,712,747 B2
(45) Date of Patent: Jul. 18, 2017

(54) METHOD AND CAMERA FOR PRODUCING AN IMAGE STABILIZED VIDEO

(71) Applicant: AXIS AB, Lund (SE)

(72) Inventor: Björn Ardö, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 15/132,843

(22) Filed: Apr. 19, 2016

(65) Prior Publication Data

US 2016/0344935 A1    Nov. 24, 2016

(30) Foreign Application Priority Data

May 18, 2015    (EP) .................................... 15167953

(51) Int. Cl.
| | |
|---|---|
| H04N 5/228 | (2006.01) |
| H04N 5/232 | (2006.01) |
| H04N 5/357 | (2011.01) |
| H04N 5/77 | (2006.01) |

(52) U.S. Cl.
CPC ....... *H04N 5/23267* (2013.01); *H04N 5/2328* (2013.01); *H04N 5/23248* (2013.01); *H04N 5/23258* (2013.01); *H04N 5/3572* (2013.01); *H04N 5/77* (2013.01); *G06T 2210/22* (2013.01)

(58) Field of Classification Search
CPC ............. H04N 5/2329; H04N 5/23264; H04N 5/23267; H04N 5/2327; H04N 5/23274; H04N 5/23277; H04N 5/23248; H04N 5/23258; H04N 5/77; H04N 5/2328; H04N 5/3572; G03B 2205/0007; G03B 2207/005; G02B 27/646; G06T 7/0024; G06T 7/0038; G06T 2210/22
USPC ......................................... 348/208.1–208.99
See application file for complete search history.

(56) References Cited

U.S. PATENT DOCUMENTS

| | | | |
|---|---|---|---|
| 2009/0160949 A1 | 6/2009 | Matsuzaki et al. | |
| 2012/0268613 A1 | 10/2012 | Nishio | |
| 2013/0208134 A1 | 8/2013 | Hamalainen | |
| 2015/0002731 A1* | 1/2015 | Raskar ............... | H04N 5/35545 348/362 |

(Continued)

FOREIGN PATENT DOCUMENTS

| | | |
|---|---|---|
| JP | 2004048346 A | 2/2004 |
| JP | 2004056581 A | 2/2004 |

(Continued)

*Primary Examiner* — Chia-Wei A Chen
(74) *Attorney, Agent, or Firm* — Volpe and Koenig, P.C.

(57) ABSTRACT

The present invention relates to a method for enabling an image stabilized video. The method comprises providing data defining a vignetting effect for digital image frames captured by a video camera; determining a dislocation value for a digital image frame captured by the video camera; determining, based on the dislocation value, a region of the digital image frame to be displayed in the image stabilized video; applying a vignetting removal process at least on pixels of the digital image frame corresponding to the region to be displayed in the image stabilized video, wherein said applying being based on the data defining the vignetting effect; and reintroducing vignetting on the region of the digital image frame to be displayed in the video based on the data defining the vignetting effect and the dislocation value.

12 Claims, 4 Drawing Sheets

(56) References Cited

U.S. PATENT DOCUMENTS

| | | | |
|---|---|---|---|
| 2015/0130907 A1* | 5/2015 | Kim .................... | H04N 5/3572 348/46 |
| 2015/0281540 A1* | 10/2015 | Matsuoka ............ | H04N 5/2355 348/362 |
| 2015/0350530 A1* | 12/2015 | Govindarao ......... | H04N 5/2259 348/349 |
| 2015/0365167 A1* | 12/2015 | Uliyar .................. | H04B 10/116 348/335 |
| 2016/0112603 A1* | 4/2016 | Mahy ................... | H04N 1/6022 358/3.08 |
| 2016/0124296 A1* | 5/2016 | Okumura ............. | G03B 17/561 348/36 |
| 2016/0150156 A1* | 5/2016 | Okumura ............. | H04N 5/2253 348/36 |
| 2016/0266503 A1* | 9/2016 | Van Voorst ............ | G01B 11/00 |
| 2016/0292842 A1* | 10/2016 | Pylkkanen .............. | G06T 7/002 |

FOREIGN PATENT DOCUMENTS

| | | |
|---|---|---|
| JP | 2007300581 A | 11/2007 |
| JP | 2010124065 A | 6/2010 |
| JP | 2012044418 A | 3/2012 |
| WO | 2007042853 A1 | 4/2007 |
| WO | 2014135739 A1 | 9/2014 |

\* cited by examiner

METHOD AND CAMERA FOR PRODUCING AN IMAGE STABILIZED VIDEO

CROSS REFERENCE TO RELATED APPLICATION

This application claims the benefit of European Patent Application No 15167953.7 filed on May 18, 2015, which is incorporated by reference as if fully set forth.

FIELD OF INVENTION

The present invention relates to the production of an image stabilized video.

BACKGROUND

Videos captured by video cameras may suffer from a problem known as camera shake. For example, a video camera mounted at an area for, e.g., monitoring the area, may from time to time experience shakes or vibrations due to shifting environmental factors, such as wind, vehicles (e.g. airplanes, trains, trucks, etc.) entering or leaving the area, construction work, and the like. Such shakes or vibrations will induce movement of the video camera, thereby causing a captured video to shake.

Prior art systems for image stabilization to reduce the effects of camera shake often include electronic manipulation of a video captured by the video camera before displaying the video. By doing so, the viewer is presented with a stable view of the video despite the induced movement of the video camera.

A photograph or drawing whose edges gradually fade into the surrounding paper is called a vignette. The art of creating such an illustration is a deliberate one. Yet the word vignetting is also used to indicate an unintended darkening of the image corners in a photographic image or stream of images, i.e. a video. The unintended and undesired vignetting is an effect caused by lens, iris and/or image sensor limitations.

For videos wherein image stabilization is performed, vignetting can become annoying. This occurs since the image frames of the video will be shifted and/or cropped differently for different image frames in order to make the video look stable. Hence, after performing image stabilization an effect of vignetting shaking will be present in the video. Vignetting removal algorithms are readily available. If the vignetting is heavy however, removing it will heavily amplify noise in the affected areas.

SUMMARY

In view of the above, it is an object of the present invention to provide a method for removing the annoyance of the vignetting moving in an image stabilized video. Moreover, it is an object of the present invention to provide a method for removing annoying vignetting effects in image stabilized video without amplifying the noise in the images.

According to a first aspect, a method for enabling an image stabilized video is provided. The method comprises providing data defining a vignetting effect for digital image frames captured by a video camera; determining a dislocation value for a digital image frame captured by the video camera; determining, based on the dislocation value, a region of the digital image frame to be displayed in the image stabilized video; applying a vignetting removal process at least on pixels of the digital image frame corresponding to the region to be displayed in the image stabilized video, wherein said applying being based on the data defining the vignetting effect; and reintroducing vignetting on the region of the digital image frame to be displayed in the video based on the data defining the vignetting effect and the dislocation value.

Removing and reintroducing the vignetting in accordance with what has been discussed above will have the effect of the flickering in the image stabilized video due to different vignetting in different image stabilized digital image frames being removed and at the same time amplification of noise is minimized.

The applying of the vignetting removal process and the reintroducing of the vignetting may be performed in a common image processing step. This will save on processor power needed and make the process faster.

The method may further comprise cropping the digital image frame based on the dislocation value forming a cropped image frame, wherein the cropped image frame corresponds to the region of the digital image frame to be displayed in the image stabilized video.

The applying may comprise applying the vignetting removal process on pixels of the cropped image frame, wherein the applying is based on the data defining the vignetting effect. The reintroducing may comprise reintroducing vignetting of the cropped image frame based on the data defining the vignetting effect and/or the dislocation value.

Providing data defining the vignetting effect may comprise providing a table defining how different pixels of an image sensor of the camera are affected by the vignetting effect.

The table may comprise data defining how all pixels of the image sensor of the camera are affected by the vignetting effect.

The table may comprise data defining how only a subset of pixels of the image sensor of the camera is affected by the vignetting effect.

In case of using a rolling shutter for capturing the digital image frame the determining of a dislocation value may comprise determining different dislocation values for at least two different rows of the sensor image frame.

In case of using a global shutter for capturing the digital image frame, the determining of a dislocation value may comprise determining a single dislocation value for the sensor image frame.

According to a second aspect, a non transitory computer-readable recording medium having recorded thereon a program for implementing the above method when executed on a device having processing capabilities is provided.

According to a third aspect an image processing device arranged to produce an image stabilized video comprising digital image frames captured by a video camera is provided. The image processing device comprises a memory comprising data defining a vignetting effect for digital image frames captured by the video camera; a dislocation value determining module arranged to determine a dislocation value for a digital image frame captured by the video camera; an image shift module arranged to, based on the dislocation value, determine a region of the digital image frame to be displayed in the image stabilized video; a vignetting removal module arranged to, based on the data defining the vignetting effect, remove vignetting from at least pixels of the digital image frame corresponding to the region to be displayed in the image stabilized video; a vignetting reintroducing module arranged to, based on the data defining the vignetting effect and the dislocation value, reintroduce vignetting on the region of the digital image frame to be displayed in the video; and a video module arranged to add consecutive digital image frames into the image stabilized video.

The device may further comprise a cropping module arranged to crop the digital image frame based on the dislocation value forming a cropped image frame, wherein the cropped image frame corresponds to the region of the digital image frame to be displayed in the image stabilized video.

The device may be a video camera comprising a motion sensor arranged to sense movement of the video camera, wherein the dislocation value determining module is arranged to determine the dislocation value for a digital image frame captured by the video camera based on the sensed movement of the video camera.

The above mentioned features of the method for enabling an image stabilized video, when applicable, apply to the second and third aspects as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION OF THE PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

As will be appreciated by one skilled in the art, aspects of the present invention may be embodied as a device, method or computer program product. Accordingly, aspects of the present invention may take the form of an entirely hardware embodiment, an entirely software embodiment (including firmware, resident software, micro-code, etc.) or an embodiment combining software and hardware. Furthermore, the present invention may take the form of a computer program product embodied in one or more computer readable medium(s) having computer readable program code embodied thereon.

Figure 1:
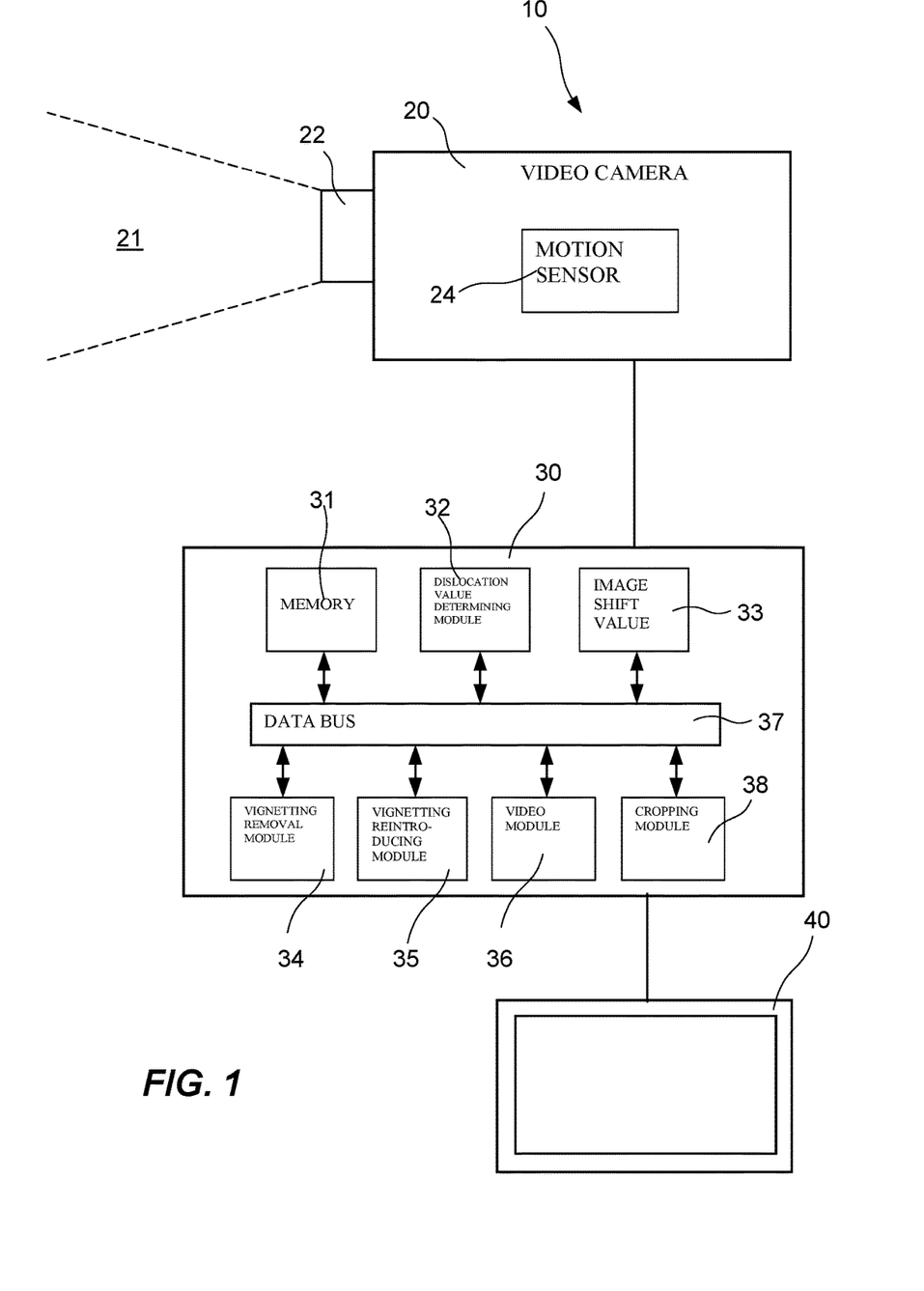
FIG. 1 is a block diagram of an embodiment of an image stabilizing system.

FIG. 1 is a block diagram of an image stabilizing system 10. The image stabilizing system 10 comprises a video camera 20, an image processing device 30 and a display 40.

The video camera 20 is positioned such that a scene of interest is within a field of view 21. The video camera 20 may be arranged for monitoring the area. The video camera 20 may comprise an adjustable focusing lens arrangement 22. The video camera 20 may be arranged to output a signal carrying information pertaining to the focal length of the focusing lens arrangement 22. The video camera 20 may be a monitoring camera for monitoring the area in front of the video camera. The video camera 20 operates to generate image frames of information representative of a video captured by the video camera 20 of the scene of interest within the field of view 21.

From time to time the video camera 20 experiences shakes or vibrations due to shifting environmental factors, such as wind, vehicles (e.g. airplanes, trains, trucks, etc.) entering or leaving the area, construction work, etc. Such shakes or vibrations will induce movement of the video camera 20, thereby causing a video captured by the video camera 20 to shake.

The video camera 20 may also comprise a motion sensor 24. The motion sensor 24 is arranged to sense movement of the video camera 20. The motion sensor 24 is arranged to output a signal corresponding to the movement of the video camera 20.

The signal outputted from the motion sensor 24 may correspond to a camera vibration amplitude. The motion of the camera due to the shake or vibration of the camera may correspond to an oscillating movement wherein each oscillation has an oscillation amplitude. The camera vibration amplitude may be a measure of one or more of the oscillation amplitudes. The camera vibration amplitude may, e.g., be a measure of the average oscillation amplitude during a predetermined time interval or a measure of the maximum oscillation amplitude during a predetermined time interval.

Moreover, the camera vibration amplitude may be divided into components. Hence, the camera vibration amplitude may, e.g., have one component pertaining to the horizontal movement of the camera and one component pertaining to the vertical movement of the camera.

Alternatively or in combination, the signal outputted from the motion sensor 24 may correspond to an instantaneous change of direction of the camera.

According to the embodiment disclosed in connection with FIG. 1 the video camera 20 is a digital video camera. However, it should be realized that also an analog video camera may be used in connection with the present invention. In case the image stabilization system comprises an analog video camera, analog image frames are communicated from the analog video camera to an analog to digital converter (not shown), which operates to generate digital representations of the analog image frames.

The digital image frames captured by the video camera 20 are fed to the image processing device 30. The image processing device 30 comprises a memory 31, a dislocation value determining module 32, an image shift module 33, a vignetting removal module 34, a vignetting reintroducing module 35, a video module 36 and a data bus 37. The image processing device 30 may further comprise a cropping module 38. The modules 32, 33, 34, 35, 36, 38 of the image processing device 30 may be implemented as software code run by a processing unit, as hardware implemented in the image processing device 30 or as a combination thereof. The dislocation value determining module 32, the image shift module 33, the vignetting removal module 34, the vignetting reintroducing module 35, the video module 36 and/or the cropping module 38 may be arranged to store and/or retrieve data from/on the memory 31. The memory 31, the dislocation value determining module 32, the image shift module 33, the vignetting removal module 34, the vignetting reintroducing module 35, the video module 36 and/or the cropping module 38 are arranged to communicate with each other over the data bus 37.

The image processing device 30 is arranged to receive signals from the video camera 20. In particular, the image processing device 30 is arranged to receive digital image frames of the video generated by the video camera 20. The image processing device 30 may also be arranged to receive the signal outputted from the motion sensor 24. The image processing device 30 may further be arranged to receive the signal carrying information pertaining to the focal length of the focusing lens arrangement 22.

Figure 2A:
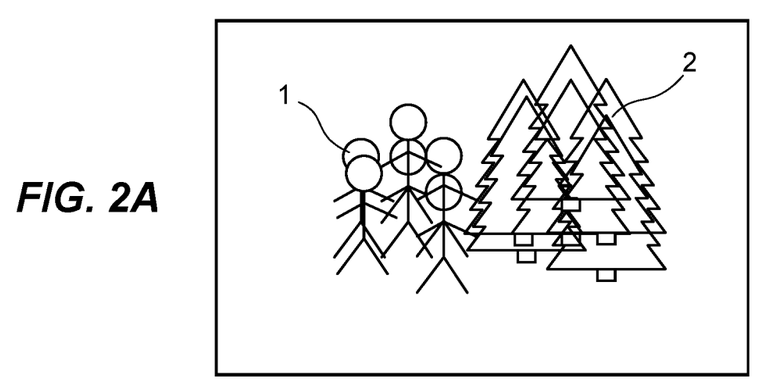
FIGS. 2A-2C are conceptual illustrations of image stabilization.

In FIG. 2A an example of digital image frames of a video affected by video camera movement before image stabilization has been performed is presented. More precisely, a plurality of superimposed digital image frames of the video depicting a scene of a person 1 and a tree 2 is presented. The video camera shake or vibration induces movement of the video camera. Due to the movement of the video camera, the person 1 and the tree 2 move to various positions within the displayed digital image frames. The superposition of digital image frames representative of the video of the scene captured at different positions of the video camera has an effect of obscuring visual information of the scene. Therefore, FIG. 2A presents a representation of an unstable video of the person 1 and the tree 2.

In order to reduce the effects of the movement of the camera, the digital image frames of the video stream are electronically manipulated before displaying the video. The dislocation value determining module 32 operates to determine a dislocation value for each digital image frame used to build up the video captured by the video camera. Depending on the image read out technique used, the dislocation and hence the method of electronic manipulation of a digital image frame may differ. In case a global shutter is used, i.e. an entire digital image frame is read out simultaneously, the whole content of the digital image frame is shifted in order to compensate for the movement of the video camera 20. In case a rolling shutter is used, i.e. a digital image frame is read out one or a few row(s) at a time, each row or a few rows in the digital image frames is/are shifted individually since they are exposed at different points in time. In case a rolling shutter is used, each row or a few rows in the digital image frames may also be interpolated individually in order to compensate for vertical movement of the video camera 20. For sake of simplicity, in the examples disclosed below, global shutter read out is used for explaining the electronic image stabilization, however, it should be understood that rolling shutter read out may as well be used for achieving the same result. Hence, the term dislocation value should be understood as a dislocation of an entire digital image frame or a dislocation of one or a few rows of a digital image frame.

The dislocation value determining module 32 may operate in various ways. According to one embodiment, the dislocation value determining module 32 is arranged to use information pertaining to the signal outputted from the motion sensor 24 together with knowledge of the focal length of the focusing lens arrangement 22 in order to determine a corresponding dislocation value on an image sensor of the video camera 20. Alternatively or in combination, also the level of zoom, i.e. the field of view, may be used for determining the dislocation value. Alternatively, features within the scene depicted by the video stream believed to be stationary between image frames may be tracked using image processing techniques. Such image processing techniques are well known to the person skilled in the art and will not be further discussed here. The dislocation value determining module 32 is further arranged to communicate the determined dislocation value to other modules of the image processing device 30.

The image shift module 33 is arranged to determine a region of the digital image frame to be displayed in the image stabilized video. This determination is made based on the dislocation value. This is made in order to compensate for the dislocation caused by camera movement. Hence, the image shift module 33 is arranged to produce a stable view of the video stream depicting the scene in front of the video camera 20. In other words, the determination of the region of the digital image frame to be displayed in the image stabilized video is made by applying a shift on each image frame in accordance with the determined dislocation values to compensate for the movement of the video camera 20. Hence, the viewer is presented with a stable view of the video despite the induced movement of the video camera. Thereby, a viewer may be provided with a stable displayed view of the scene depicted by the video.

The cropping module 33 is arranged to crop the digital image frame based on the dislocation value forming a cropped image frame. The cropped image frame corresponds to the region of the digital image frame to be displayed in the image stabilized video. The cropping is not necessarily to be seen as an actual cropping of the digital image frame removing some pixels of the original digital image frame. Instead, in some embodiments the cropping is to be understood as hiding pixels of the digital image frame not to be displayed in the image stabilized video. The unwanted pixels may be hidden by applying a mask masking out the unwanted pixels. However, in some embodiments the cropping is an actual cropping of the digital image frame removing some pixels of the original digital image frame before displaying the digital image frame as a part of the image stabilized video.

The cropping module 33 is arranged to crop digital image frames in accordance with the determined dislocation value for the respective digital image frame to compensate for the movement of the video camera 20. The cropping module 33 may also be arranged to apply a scale factor. The scale factor may be arranged such that the pixel count (pixel resolution) between images is preserved. This may e.g. be applied when the images is cropped into images of different size.

Figure 2B:
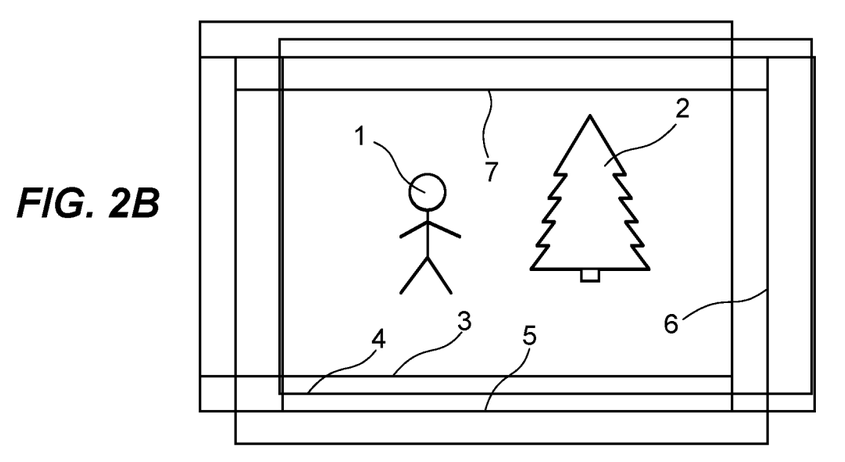

In FIG. 2B, a representation of a video after image stabilization has been applied to the unstable video presented in FIG. 2A is presented. In FIG. 2B, the image frames of the video are displayed after determining and applying dislocation value for each digital image frame. Hence, FIG. 2B is a representation of a video after electronic image stabilization according to the above has been applied to the unstable video presented in FIG. 2A. In FIG. 2B, the stabilized video is now centrally located and stable within the display. Hence, the image stabilization system 10 operates to shift each image frame such that the person 1 and the tree 2 appear to be stable in the display. However, as the image stabilization operates to shift entire image frames, part of the displayed video will not contain any displayed information and will therefore appear blank. Furthermore, as indicated in FIG. 2B by solid lines 3, 4, 5, 6, 7, which are representative of one edge per displayed image frame, the edges of the video will continuously be moving as the image stabilization system operates to present a stable video stream of the scene. Hence, the peripheral region of the displayed video stream will be continuously moving, which is distracting to the viewer.

Figure 2C:
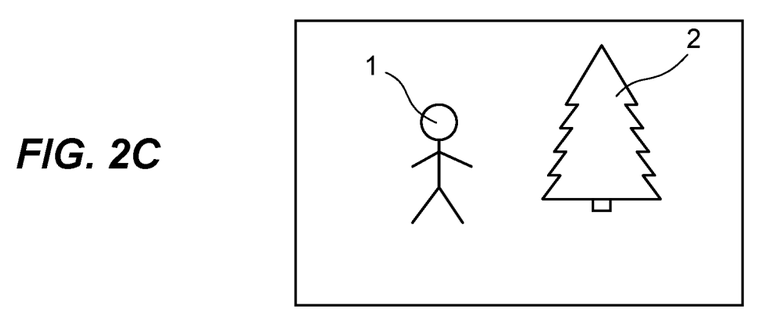

The above problem may e.g. be solved by cropping. In FIG. 2C a representation of a video after cropping of the digital images of FIG. 2B is presented. In FIG. 2C, the cropped image frames of the video stream are displayed on top of each other. Hence, FIG. 2C is a representation of a video after image stabilization and cropping according to the above has been applied to the unstable video presented in FIG. 2A. In FIG. 2B, the stabilized video is now centrally located and stable within the display.

As mentioned above after applying electronic image stabilization, vignetting can become annoying. Moreover, the presence of changing vignetting in-between the image frames of the video may affect a motion detection performed on the video. Depending on the movement of the camera, the image frames will be shifted and/or cropped differently, in order to make the video appear stable. This will however have the effect of the vignetting moving instead.

The obvious solution to this problem is to remove the vignetting digitally. That will however result in more noise close to the edges of the images, since noise in the image will increase due to removal of vignetting.

According to the present invention, this problem is alleviated by first removing the vignetting (either before or after image stabilization) and then reapplying a uniform vignetting again to the stabilized image. With uniform is meant substantially similar vignetting for the regions of subsequent digital image frames to be displayed in the image stabilized video. This will remove the annoyance of the vignetting moving while minimizing the added noise. Another benefit is that when the camera is not moving at all, the operations will even each other out, resulting in no added noise at all.

Hence, the vignetting removal module 34 is arranged to remove vignetting from at least pixels of the digital image frame corresponding to the region to be displayed in the image stabilized video. The removal is based on data defining the vignetting effect for digital image frames captured by the video camera 20. Removal of vignetting may be made in different ways known by a person skilled in the art. However, common to vignetting removing processes are that noise in the digital image frame is amplified.

The data defining the vignetting effect for digital image frames captured by the video camera 20 is stored in the memory 31. As mentioned above the vignetting effect may depend on various factors such as camera settings and/or lens limitations. The impact on a digital image frame captured by the camera 20 due to the vignetting effect may be determined in many different ways known to a person skilled in the art. And thus data defining the vignetting effect for digital image frames captured by the video camera 20 may be deduced and stored in the memory 31. The data defining the vignetting effect may e.g. be provided as a table defining how different pixels of an image sensor of the camera are affected by the vignetting effect. The table may comprise data defining how all pixels of the image sensor of the camera are affected by the vignetting effect. Alternatively, the table may comprise data defining how only a subset of pixels of the image sensor of the camera is affected by the vignetting effect. How the vignetting effect will affect the pixels not being part of the subset may then e.g. be found by interpolation.

The vignetting reintroducing module 35 is arranged to reintroduce vignetting on the region of the digital image frame to be displayed in the video. The reintroducing is based on the data defining the vignetting effect and the dislocation value. The vignetting removal module 34 and vignetting reintroducing module 35 may work independently of each other such that the vignetting removal module 34 is arranged to remove the vignetting and thereafter the vignetting reintroducing module 35 is arranged to reintroduce vignetting. However, according to one embodiment, the vignetting removal module 34 and vignetting reintroducing module 35 is arranged to work simultaneously and hence the vignetting removal and the reintroducing of the vignetting are performed in a common image processing step.

Figure 3A:
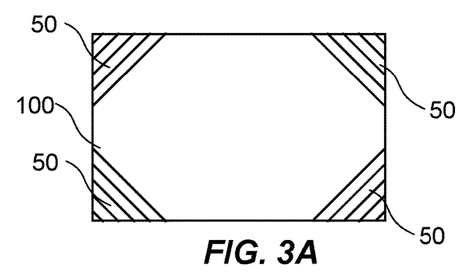
FIGS. 3A-3E and 4A-4C are conceptual illustrations of removal and reintroduction of vignetting during image stabilization.
Figure 3B:
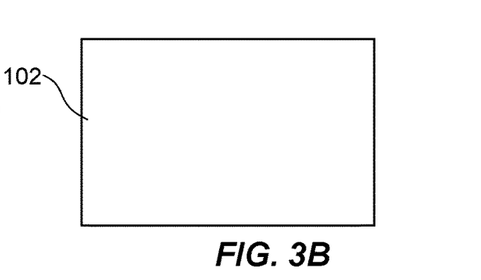
Figure 3C:
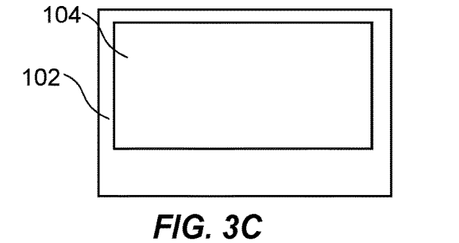
Figure 3D:
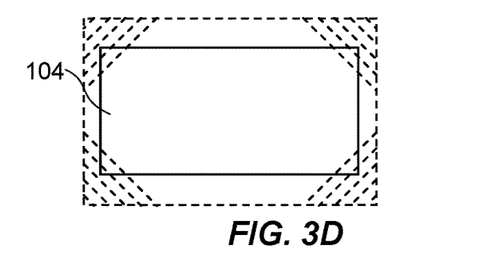
Figure 3E:
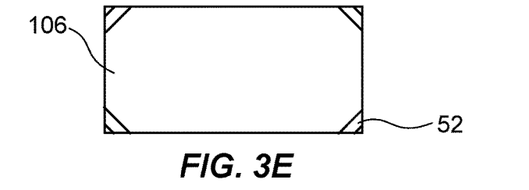

The removal and reintroduction of the vignetting will now be further explained in connection with FIGS. 3A-3E and 4A-4C. In FIG. 3A an original digital image frame 100 captured by the video camera 20 is illustrated. The original digital image frame 100 comprises vignetting areas 50. In FIG. 3B, the original digital image frame with the vignetting areas removed after applying a vignetting removal process using the vignetting removal module 34 is illustrated. The original digital image frame with the vignetting area removed is here referred to as digital image frame 102. In FIG. 3C, a determined region 104 of the digital image frame 102 to be displayed in the image stabilized video is illustrated. The region 104 is determined in accordance with what is discussed above. In FIG. 3D, the region 104 is illustrated as being centrally superimposed on top of the original digital image frame 100; this in order to visualize what kind of vignetting to reintroduce. Hence, the vignetting to reintroduce depend both on the data defining the vignetting effect for original digital image frame 100 captured by the video camera and the dislocation of the region 104. In FIG. 3E, a resulting digital image frame 106 to be displayed with reintroduced vignetting 52 is illustrated.

Figure 4A:
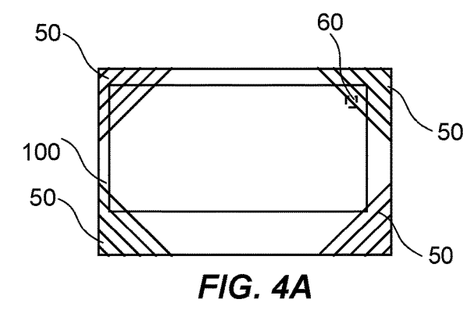
Figure 4B:
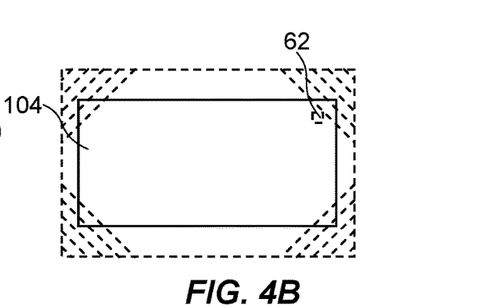
Figure 4C:
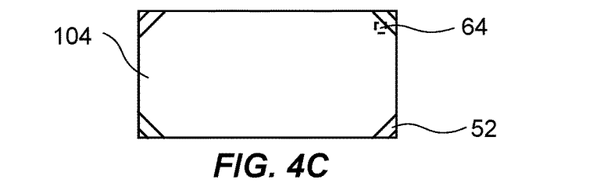

In connection with FIGS. 3A-3E are discussed removal and reintroduction of the vignetting, where the removal and the reintroduction are illustrated as individual image processing steps. However, the removal and reintroduction may also be performed in a common image processing step; this will be illustrated in FIGS. 4A-4C. In FIG. 4A, the same original digital image frame as in FIG. 3A is illustrated. However, the determined region 104 of the digital image frame to be displayed in the image stabilized video is also illustrated. The region 104 is determined in accordance with what is discussed above; however, it shall be stated that the determined region 104 is determined before applying vignetting removal. Moreover, a specific pixel 60 of the region 104 is highlighted. The highlighted specific pixel 60, of course, also belongs to the original digital image frame 100. Let's assume that the data defining how to remove the vignetting effect for the specific pixel 60 is set to be $V_{remove}$. In FIG. 4B, the region 104 is illustrated as being centrally superimposed on top of the original digital image frame 100; this in order to visualize what kind of vignetting to reintroduce. The pixel 62 of the region 104 having the same position as the specific pixel 60 in FIG. 4A is marked out. Due to the dislocation of the region, the pixel 62 does not correspond to the specific pixel 60 in the original digital image frame as illustrated in FIG. 4A. Instead pixel 62 corresponds to another pixel in the original digital image frame. Let's assume that the data defining how to reintroduce the vignetting effect for the pixel 62 is set to be $V_{reintro}$. Now the removal and introduction of the vignetting may be performed in a single image processing step by applying $V_{remove}$ and $V_{reintro}$ simultaneously to the pixel data of pixel 64 of the region 104, as illustrated in FIG. 4C. Thereafter, the same procedure can be performed for all pixels of the region. The result will be the same as in the process illustrated in FIGS. 3A-3E above with the difference that potential rounding errors might be avoided.

Removing and reintroducing the vignetting in accordance with what has been discussed above will have the effect of the flickering in the image stabilized video due to different vignetting in different image stabilized digital image frames is removed and at the same time minimizing the added noise to the video.

The video module 36 is arranged to add consecutive digital image frames into the image stabilized video.

The image stabilized video may then be outputted to the display 40.

Figure 5:
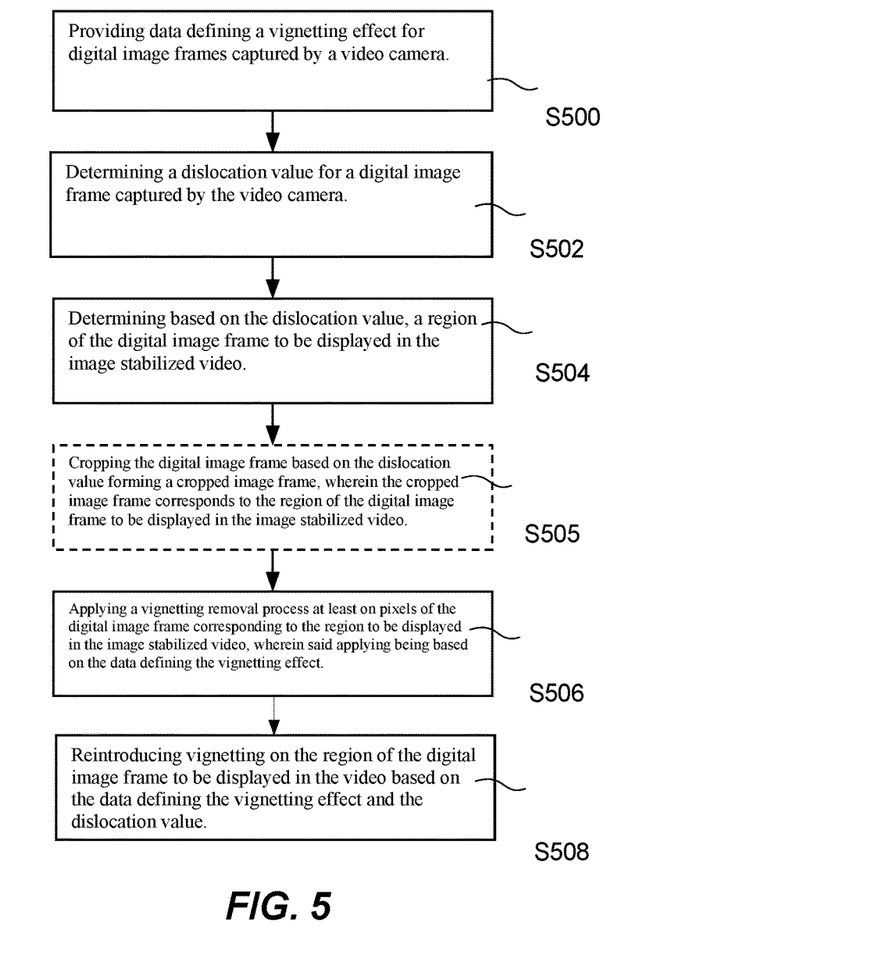
FIG. 5 is a block diagram of a method for enabling an image stabilized video.

In FIG. 5 a block diagram of a method for enabling an image stabilized video is shown. The method comprises providing data defining a vignetting effect for digital image frames captured by a video camera (S500). Determining a dislocation value for a digital image frame captured by the video camera (S502). Determining based on the dislocation value, a region of the digital image frame to be displayed in the image stabilized video (S504). Applying a vignetting removal process at least on pixels of the digital image frame corresponding to the region to be displayed in the image stabilized video, wherein said applying being based on the data defining the vignetting effect (S506). Reintroducing vignetting on the region of the digital image frame to be displayed in the video based on the data defining the vignetting effect and the dislocation value (S508).

The method may further comprise cropping the digital image frame based on the dislocation value forming a cropped image frame, wherein the cropped image frame corresponds to the region of the digital image frame to be displayed in the image stabilized video (S505).

The person skilled in the art realizes that the present invention by no means is limited to the preferred embodiments described above. On the contrary, many modifications and variations are possible within the scope of the appended claims.

Figure 6:
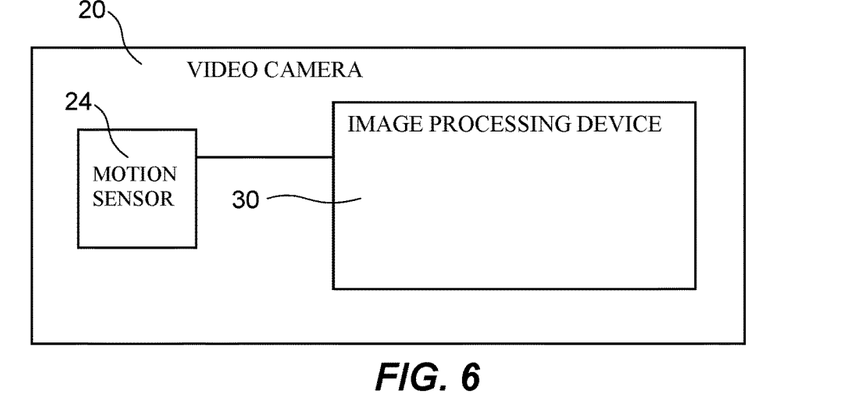
FIG. 6 is a block diagram of an embodiment of an image stabilizing system.

For example, the image processing device 30 may be implemented inside the video camera 20. This is illustrated in FIG. 6.

In case of using a rolling shutter for capturing the digital image frame said determining a dislocation value may comprise determining different dislocation values for at least two different rows of the sensor image frame.

In case of using a global shutter for capturing the digital image frame said determining a dislocation value may comprise determining a single dislocation value for the sensor image frame.

Additionally, variations to the disclosed embodiments can be understood and effected by the skilled person in practicing the claimed invention, from a study of the drawings, the disclosure, and the appended claims.

What is claimed is:

1. A method for enabling an image stabilized video, the method comprising:
providing data defining a vignetting effect for digital image frames captured by a video camera;
determining a dislocation value for a digital image frame captured by the video camera, wherein the dislocation value is a dislocation of the entire digital image frame or a dislocation of one or a few rows of the digital image frame, the dislocation being induced by camera movement;
applying a shift on the digital image frame in accordance with the determined dislocation value to compensate for movement of the video camera;
cropping the digital image frame based on the dislocation value forming a cropped image frame, wherein the cropped image frame corresponds to a region of the digital image frame to be displayed in the image stabilized video;
applying a vignetting removal process at least on pixels of the digital image frame corresponding to the region to be displayed in the image stabilized video, wherein said applying of the vignetting removal process is based on the data defining the vignetting effect;
reintroducing vignetting on the region of the digital image frame to be displayed in the video based on the data defining the vignetting effect and the dislocation value; and
displaying the region of the digital image frames to be displayed as part of the image stabilized video.

2. The method according to claim 1, wherein the applying of the vignetting removal process and the reintroducing of the vignetting are performed in a common image processing step.

3. The method according to claim 1, wherein the applying of the vignetting removal process comprises applying the vignetting removal process on pixels of the cropped image frame, wherein the applying is based on the data defining the vignetting effect, and wherein the reintroducing comprises reintroducing vignetting to the cropped image frame based on the data defining the vignetting effect.

4. The method according to claim 3, wherein reintroducing vignetting to the cropped image frame is also based on the dislocation value.

5. The method according to claim 1, wherein providing data defining the vignetting effect comprises providing a table defining how different pixels of an image sensor of the camera are affected by the vignetting effect.

6. The method according to claim 5, wherein the table comprises data defining how all pixels of the image sensor of the camera are affected by the vignetting effect.

7. The method according to claim 5, wherein the table comprises data defining how only a subset of pixels of the image sensor of the camera is affected by the vignetting effect.

8. The method according to claim 1, wherein in case of using a rolling shutter for capturing the digital image frame the determining of a dislocation value comprises determining different dislocation values for at least two different rows of a sensor image frame.

9. The method according to claim 1, wherein in case of using a global shutter for capturing the digital image frame the determining of a dislocation value comprises determining a single dislocation value for a sensor image frame.

10. A non-transitory computer-readable recording medium having recorded thereon a program for implementing the method according to claim 1 when executed on a device having processing capabilities.

11. An image processing device arranged to produce an image stabilized video comprising digital image frames captured by a video camera, the image processing device comprising:
- a memory comprising data defining a vignetting effect for digital image frames captured by the video camera;
- a dislocation value determining module arranged to determine a dislocation value for a digital image frame captured by the video camera, wherein the dislocation value is a dislocation of the entire digital image frame or a dislocation of one or a few rows of the digital image frame, the dislocation being induced by camera movement;
- an image shift module arranged to, based on the dislocation value, apply a shift on the digital image frame in accordance with the determined dislocation value to compensate for movement of the video camera;
- a cropping module arranged to crop the digital image frame based on the dislocation value forming a cropped image frame, wherein the cropped image frame corresponds to a region of the digital image frame to be displayed in the image stabilized video;
- a vignetting removal module arranged to, based on the data defining the vignetting effect, remove vignetting from at least pixels of the digital image frame corresponding to the region to be displayed in the image stabilized video;
- a vignetting reintroducing module arranged to, based on the data defining the vignetting effect and the dislocation value, reintroduce vignetting on the region of the digital image frame to be displayed in the video; and
- a video module arranged to add consecutive digital image frames into the image stabilized video.

12. The device according to claim 11, wherein the device is a video camera comprising a motion sensor arranged to sense movement of the video camera, wherein the dislocation value determining module is arranged to determine the dislocation value for a digital image frame captured by the video camera based on the sensed movement of the video camera.

* * * * *